(No Model.)

W. B. SNOW.
ELECTRIC BLOWER OR FAN.

No. 463,585. Patented Nov. 17, 1891.

Witnesses:
Edward H. Allen
Fred S. Greenleaf

Inventor,
Walter B. Snow.
by Crosby & Gregory attys.

UNITED STATES PATENT OFFICE.

WALTER B. SNOW, OF WATERTOWN, ASSIGNOR TO THE B. F. STURTEVANT COMPANY, OF BOSTON, MASSACHUSETTS.

ELECTRIC BLOWER OR FAN.

SPECIFICATION forming part of Letters Patent No. 463,585, dated November 17, 1891.

Application filed April 7, 1891. Serial No. 387,999. (No model.)

*To all whom it may concern:*

Be it known that I, WALTER B. SNOW, of Watertown, county of Middlesex, State of Massachusetts, have invented an Improvement in Electric Blowers or Fans, of which the following description, in connection with the accompanying drawings, is a specification, like letters and figures on the drawings representing like parts.

This invention has for its object to provide a blower or fan to be driven by an electric motor coupled directly to the blower or fan shaft; and the invention consists in certain details of arrangement and construction, to be hereinafter described, and pointed out in the claims.

Figure 1:
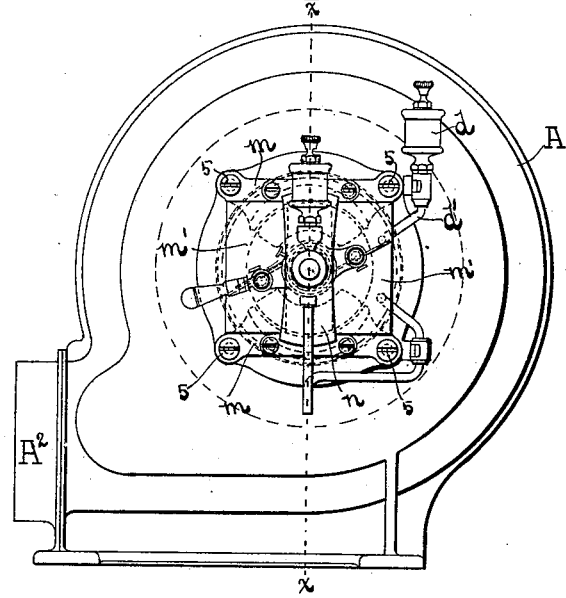
Figure 2:
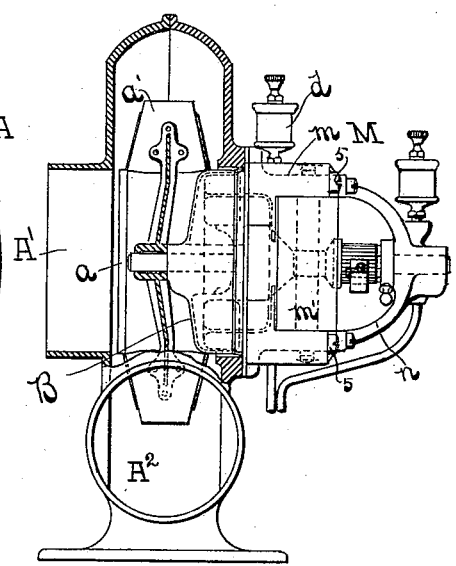
Figure 3:
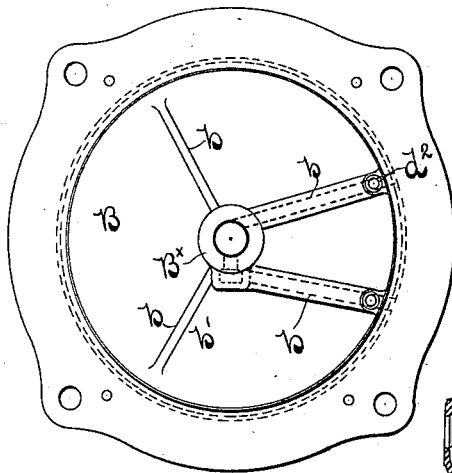
Figure 5:
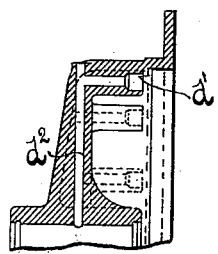
Figure 4:
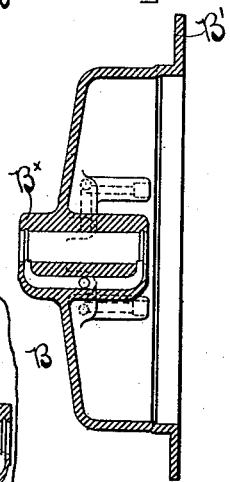

Figure 1 represents in side elevation a blower or fan driven by an electric motor in accordance with this invention; Fig. 2, a vertical section on the dotted line $x\,x$, Fig. 1; Figs. 3, 4, and 5, elevation and sectional views, respectively, of the shield and bearing to be described; and Figs. 6 and 7, modifications to be referred to.

Referring to the drawings, the inclosing shell or case A, having the usual inlet and discharge openings $A'\,A^2$, is and may be of usual form or construction.

The shell A at its side opposite the inlet is provided with a central opening for the reception of the cup-shaped shield B, having a peripheral flange B', which rests upon and is secured to the face of the shell. The shield B, preferably of brass or other non-magnetic metal, as represented, has a boss $B^\times$ raised at its center, in which is formed a bearing for one end of the fan-shaft $a$, which shaft is extended within the shell to receive and carry the fan $a'$, which may be of desired shape and construction, and the shaft at its opposite end is journaled in a yoke or bracket $n$, bolted to or forming a part of the field-pieces $m$ of an electric motor M, bolted to the side of the shell by bolts 5, which bolts also pass through corresponding holes in the flange B' of the shield B, holding the same in place, the shield being of non-magnetic metal serving the additional function of insulating or removing the motor from the magnetic influences of the metal shell of the blower. The field-pieces $m$ of the motor M are energized by the usual field-magnets $m'$, and the armature (shown by dotted lines, Fig. 2) is placed upon the shaft $a$, which is provided with a commutator and brushes, as shown, which are and may be of usual kind and need not be herein further described, the rotation of the armature between the fields of the motor taking with it the shaft and fan.

An oil-cup $d$ is, as herein represented, placed upon the motor M, the oil from which is conveyed to the bearing $B^\times$, carried by the shield B, by means of a tube $d'$, and a passage $d^2$, formed in one of the strengthening-ribs $b$ of the shield, which rib may be made larger, as shown, for that purpose. A catch or drip chamber $b'$ for oil escaping from the journal may also be formed in the bearing $B^\times$, as indicated by dotted lines, Fig. 3, an outlet for which may be had through another of the ribs $b$, as shown.

By employing the shield B to support or carry the bearing $B^\times$ the construction is simplified. The bearing may be supported entirely within the shell A, making it possible to bring the motor much nearer the shell than has heretofore been possible with the bearing supported by an independent bracket outside the shield, and the shield at the same time effectually protects the armature and other parts of the motor from dust and dirt when the blower is used as a suction-fan to remove dirt, &c., as in a planing or wood-working mill or machine-shop.

It is very desirable that the blower and motor be so constructed that if necessary the blower may be secured to a side wall or ceiling of a room to better adapt it to the particular class of work for which it may be required, and still permit the motor, with its various accompaniments, as oil-cups and controlling devices, to be in the same position as before. With this end in view the motor is constructed with the holes for the reception of the attaching-bolts 5, arranged equidistant from the center of rotation of the shaft $a$ and from each other, the bolt-holes in the shield and in the shell being arranged in corresponding like manner, so that in whatever position with relation to the blower or shell the shield and motor may be placed the holes in the motor for the reception of the bolts 5 and holes in the shell and shield for the same bolts will always register perfectly, thus permitting the blower to be placed in any position or angle with the motor always in one and the same position.

Figure 6:
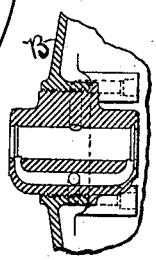
Figure 7:
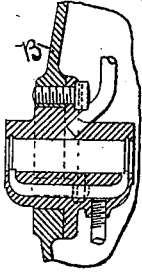

If desired, the bearing B$^\times$ may be independent of the shield B, but carried thereby, Fig. 6 representing the bearing B$^\times$ as tapped into the shield, and Fig. 7 representing the bearing as placed in and bolted to the shield, the conducting-tubes and passages for the oil being varied slightly to meet the different constructions.

I claim—

1. In a blower or fan, the inclosing shell having a side opening, through which the fan-shaft is extended, combined with an independent shield to close said side opening and a bearing for the fan-shaft carried by said shield, substantially as described.

2. In a blower or fan, the inclosing shell having a side opening, combined with a shield B, carrying a bearing for the fan-shaft and provided with a flange B′, and a motor secured thereto, substantially as described.

3. In a blower or fan, the inclosing shell having a side opening, through which the fan-shaft is extended, combined with an independent shield to close said opening, a bearing for the fan-shaft carried by said shield, strengthening-ribs having oil-passages leading to said bearing, and a motor secured to said shield, substantially as described.

4. In a blower or fan, the inclosing shell and the flanged shield B, carrying a bearing for the fan-shaft, combined with a motor secured to said flanged shield and to the shell by bolts, as 5, placed equidistant from the center of rotation of the fan-shaft and from each other, substantially as and for the purpose set forth.

In testimony whereof I have signed my name to this specification in the presence of two subscribing witnesses.

WALTER B. SNOW.

Witnesses:
BERNICE J. NOYES,
FREDERICK L. EMERY.